May 12, 1964  T. J. JORDAN ETAL  3,133,285
SPHERICAL LUNEBERG LENS COMPOSED OF A PLURALITY OF PYRAMIDAL
SECTORS EACH HAVING A GRADED DIELECTRIC CONSTANT
Filed Jan. 14, 1963  3 Sheets-Sheet 1

Inventors:
Thomas J. Jordan,
Henry T. Plant,
by Paul A. Frank
Their Attorney.

May 12, 1964  T. J. JORDAN ETAL  3,133,285
SPHERICAL LUNEBERG LENS COMPOSED OF A PLURALITY OF PYRAMIDAL
SECTORS EACH HAVING A GRADED DIELECTRIC CONSTANT
Filed Jan. 14, 1963   3 Sheets-Sheet 2
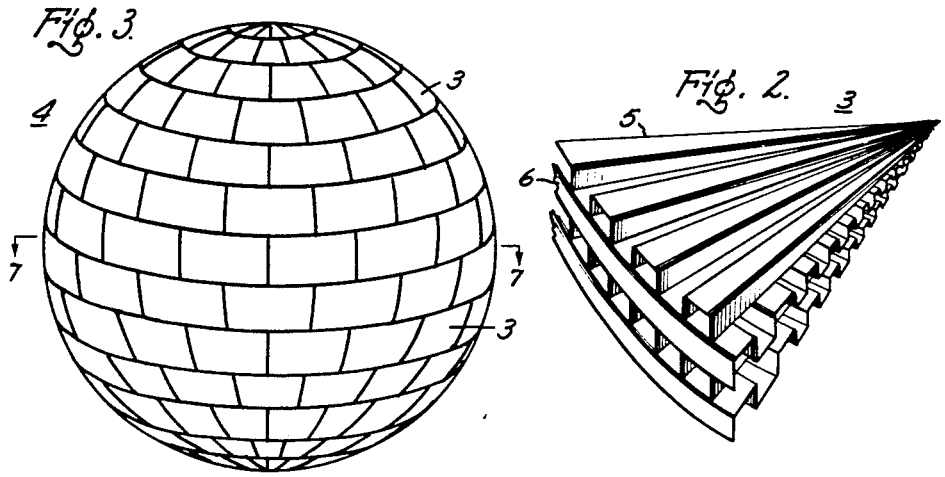
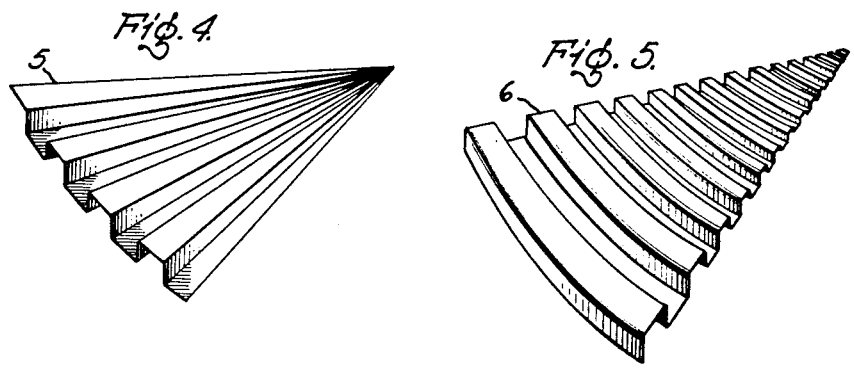
Inventors:
Thomas J. Jordan,
Henry T Plant,
by Paul A. Frank
Their Attorney.

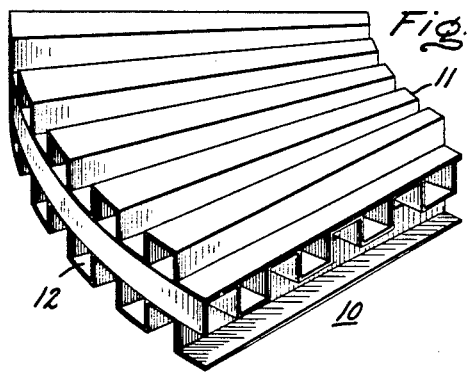
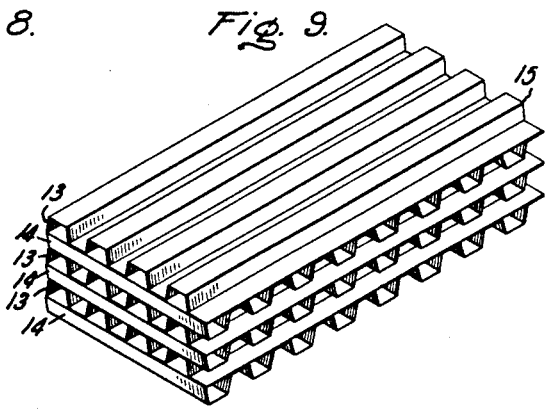
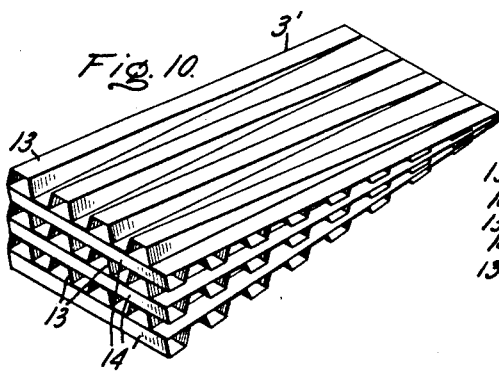
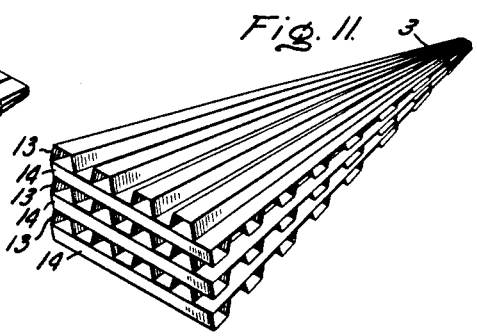
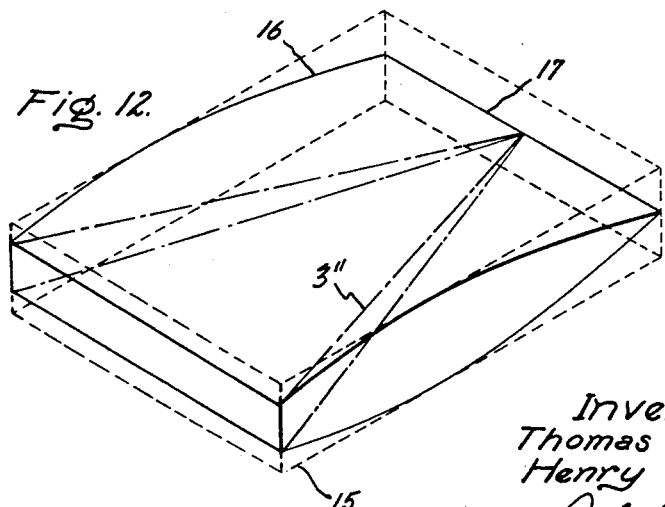
Inventors:
Thomas J. Jordan,
Henry T. Plant,
by Paul A. Frank
Their Attorney.

United States Patent Office 3,133,285
Patented May 12, 1964

3,133,285
SPHERICAL LUNEBERG LENS COMPOSED OF A PLURALITY OF PYRAMIDAL SECTORS EACH HAVING A GRADED DIELECTRIC CONSTANT
Thomas J. Jordan, Ballston Lake, and Henry T. Plant, Rotterdam, N.Y., assignors to General Electric Company, a corporation of New York
Filed Jan. 14, 1963, Ser. No. 251,369
14 Claims. (Cl. 343—911)

This invention relates to a spherical lens and, more particularly, to a spherical microwave lens having the characteristics of a "Luneberg" lens.

In accordance with "Luneberg" theory, as described by R. K. Luneberg in "Mathematical Theory of Optics," Brown University Advanced Instruction and Research in Mechanics, Providence, Rhode Island, summer of 1944, it can be shown that lenses having a variable dielectric constant together with a spherical symmetrical refracting surface will focus parallel rays striking the sphere at a point on the periphery of the sphere diametrically opposed to the tangent plane of entry provided that the relative dielectric constant varies in accordance with the "Luneberg" equation, $$K=n^2=2-(r/R)^2$$

where $K$ is the relative dielectric constant, hereinafter referred to as the dielectric constant, $n$ is the index-of-refraction, $r$ is the radius to the point of measurement, and $R$ is the radius of the sphere. It can easily be seen that the dielectric constant will vary from two at the sphere's center to one at the surface of the sphere.

In practice, it has been difficult to construct lenses meeting the theoretical Luneberg requirements and, therefore, the use of reflective antenna systems has gained wide acceptance because of the relative ease of constructing such systems.

Refractive antenna systems utilizing "Luneberg" lenses to collimate and/or focus microwave beams have distinct advantages over reflective systems. In a refractive system using a spherical lens, there is no inherent limitation on the size of the angle through which the beam may be scanned. Only the wave guide and feed horns need be moved in order to scan or revolve the microwave beam in any direction while, with reflective systems, the entire assemblage of reflector, wave guides, and feed horns must be moved as a unit, thus, increasing the inertial mass and complexity of operation. Additionally, a spherical "Luneberg" lens permits multibeam operation using the same or different wavelengths with a single lens, something that cannot be easily performed with a reflective system.

In the past, several methods have been used for producing spherical "Luneberg" lenses but each of these methods have their individual disadvantages. One such method utilizes a series of flat circular plates of varying radii stacked together to approximate a spherical lens. In order to vary the dielectric constant in proportion to the radius as is required by the Luneberg theory, various sized holes are drilled in the plates at various locations thus giving an "effective" dielectric constant of the proper value at each point. This method will not provide a smooth radial variation of the dielectric constant either within a single disk or through the stacked disks. Other disadvantages of this method are that the product lenses are nonhomogeneous and anisotropic and, consequently, are more susceptible to polarization.

A more popular method commonly used for fabricating spherical "Luneberg" lenses involves molding foamed plastics into a plurality of hollow hemispheres of serially increasing diameters, each succeeding hemisphere closely mating with the preceding one to generate a solid sphere. The hemispheres are formed such that the density and dielectric constant of each hemisphere is essentially constant throughout its radial width and the innermost sphere or core has a dielectric constant of two while each successive shell has a dielectric constant diminishing in value in accordance with the Luneberg equation. Aside from requiring a large number of precision molds, this construction results in a stepped function variation of the dielectric constant with respect to the radius of the sphere rather than a linear function or a curvilinear function variation as ideally represented by the Luneberg equation. Also, some reflection and refraction will occur throughout the sphere due to the stepped function variation in the dielectric constant at the interface of successive shells. Another disadvantage arises because of the difficulty in attaining density uniformity in each shell, thus, causing inaccuracies in dielectric constant.

Use of foamed plastics for making the lens produces further limitations due to the heat generation occurring in the lens body. Foamed plastics are excellent thermal insulators, and as such, lenses made from foamed plastics have limited power-handling capability resulting in restriction to relatively low power operation.

In view of the advantages derived from using a "Luneberg" lens in refractive systems, it is an important object of this invention to provide spherical lens construction exhibiting characteristics closely approximate those of a theoretical "Luneberg" lens and which are not limited by the disadvantages above described.

Another object of this invention is to provide spherical lens constructions wherein the dielectric constant varies linearly from the center of the sphere to its surface.

Still another object of this invention is to provide a spherical lens fabricated from a simulated foamed plastic.

A further object of this invention is to provide a spherical lens from a simulated foamed plastic which has included therein a plurality of coolant passages, thus, extending the power handling capacity of the lens.

A still further object of this invention is to provide a method for fabricating spherical lens constructions having physical characteristics described by the Luneberg equation.

Further objects and advantages of this invention will be better understood from the following description taken in connection with the accompanying drawings in which:

FIGURE 2 illustrates a laminated pyramidal-spherical sector;

FIGURE 3 illustrates a spherical lens fabricated from a plurality of pyramidal-spherical sectors;

FIGURE 4 illustrates a radially corrugated sheet which forms a component of the sector;

FIGURE 5 illustrates a transversely corrugated sheet which forms a component of the sector;

FIGURE 8 illustrates a laminated, truncated, pyramidal-spherical sector;

FIGURE 9 illustrates a block laminate formed from corrugated sheets;

FIGURE 10 illustrates the block laminate reformed in one plane into a wedge-shaped sector;

FIGURE 11 illustrates the block laminate reformed in two planes into a pyramidal-spherical sector; and FIGURE 12 illustrates a block laminate prior to reshaping (dotted lines) and subsequent to reshaping (solid lines).

Figure 1:
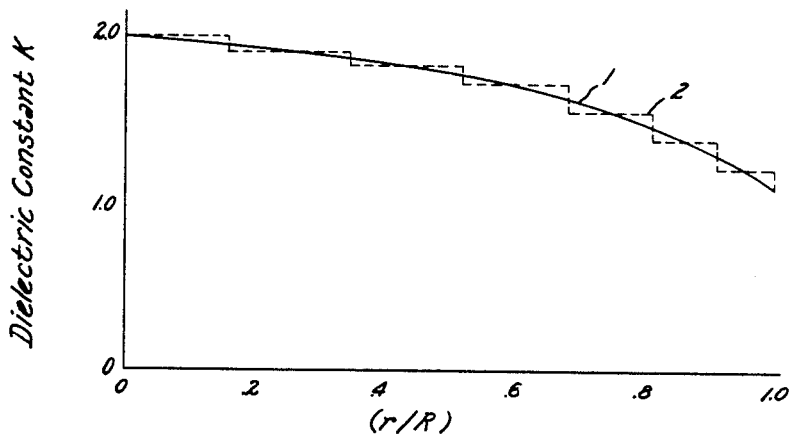
FIGURE 1 illustrates, by a solid line, the ideal curvilinear Luneberg function and, by a dotted line, the commonly used function for approximating the ideal functions.

In accordance with the various embodiments of this invention, a spherical lens whose characteristics closely approximate the Luneberg equation is produced by fabricating a simulated dielectric foam having a cellular structure with controlled, well-defined, air cells therein. The simulated dielectric foam is formed into a plurality of generally pyramidal-spherical sectors which, upon assembly, produce the desired spherical lens.

Useful materials of construction for the individual elements from which the final lens is obtained may be selected from the broad class of solid dielectrics which may be fashioned into various unitary shapes, especially corrugated sheets. Dielectric materials having a dielectric constant in the general range of one ot five prove especially useful so that the element thickness for lens construction need not be excessively thin to satisfy design requirements in accordance with the above-recited considerations. In further explanation, if the dielectric constant of a finished lens is to vary from a value of two at the sphere's center to a value of one at the surface of the sphere, it would require excessively thin elements of a dielectric material having a dielectric constant of around ten or more to provide a final composite dielectric in the range mentioned. Excessively thin elements of the dielectric material are not preferred because of the manufacturing difficulties encountered with such members which generally require special handling and storage facilities. Satisfactory dielectric materials in the desired dielectric constant range may be selected from a broad class of organic and inorganic materials which includes such diverse substances as ceramics, glass, fiber-reinforced ceramics, plastics, and others. Heat-deformable plastics, such as thermoplastic synthetic organic polymer film-formers, are especially preferred materials because of relative ease with which the forming and joining operations can be accomplished including molding, extrusion, vacuum forming, and the like. It is also within contemplation of the invention to employ sheets of different dielectric materials in the same lens construction in order to achieve a desired linear variation in the dielectric constant of the member.

An ideal lens for a microwave antenna system has the ability to collimate microwave beams from a point radiation source with a minimum of loss through the lens. Such an ideal lens will also focus energy from a plane wave or phase front incident upon the lens to a point on the lens surface. It can be shown theoretically that a sphere having a dielectric constant which varies in accordance with the formula $K=2-(r/R)^2$ will focus plane phase wave fronts incident upon the surface of the sphere at a point diametrically opposed to the tangent plane of entry of the phase front with a minimum of aberration no matter what portion of the sphere intercepts the phase front. The derivation of this formula may be found in "Mathematical Theory of Optics" by R. K. Luneberg, pages 208–213. According to this formula, an ideal lens will have a dielectric constant of two at its center and one on its surface.

In spite of the advantages obtained by using such a spherical lens, use of them has been severely limited by the manifest impracticability of making a spherically symmetrical body whose dielectric constant varies in the prescribed manner. This is illustrated in FIGURE 1 where the solid line 1 represents the ideal Luneberg function while the dotted lines 2 represent the prior art's stepped function approximation thereof. The essence of this invention lies in producing a lens, the dielectric constant variation of which more closely approximates the ideal Luneberg function.

The use of foamed plastic for fabricating microwave lenses has a definite limitation with respect to the power handling capacity of the microwave lens made therewith. Specifically, since foamed plastics are excellent thermal insulators, the heat generated in the lens body during transmission of the beams through the lens is retained within the lens body.

In order to facilitate dissipation of the generated heat with the lens and to vary the dielectric constant throughout the lens in accordance with a predetermined function, a foamed construction is simulated by laminating thin corrugated dielectric sheets in such a manner that the corrugation axes of adjacent sheets are angularly disposed with respect to one another. This results in the formation of clearly defined air cells or passages through which a coolant may be passed. In addition, since the dielectric constant is a function of density, by varying the frequency of corrugations the dielectric constant may be varied in accordance with the predetermined function, in this case the Luneberg function.

A spherical "Luneberg" lens may be fabricated by assembling a plurality of pyramidal-spherical sectors 3 having the unit construction above defined, illustrated in FIGURE 2, into a solid spherical body 4 as illustrated in FIGURE 3. A "pyramidal-spherical sector" is defined as being a sector of a sphere having an arcuate base and having sides comprising several triangles with a common apex disposed such that the bases of the triangular sides form the sides of the arcuate base. The pyramidal-spherical sector may be fabricated by laminating a plurality of corrugated thin plastic sheets 5 and 6 whose corrugation axes are angularly disposed to one another resulting in a cellular structure as illustrated in FIGURE 2.

One method of forming the described pyramidal-spherical sector is illustrated in FIGURES 2, 4, and 5 wherein a plurality of thin plastic sheets having a constant thickness are corrugated such that the corrugation height increases linearly. These sheets are initially cut into triangular forms as illustrated in FIGURES 4 and 5 and are corrugated such that the corrugation height increases linearly from the apex of the triangle outwardly towards the base. In the form illustrated, half the sheets will be corrugated such that the corrugation axes extend radially from the apex towards the base, FIGURE 4, while the remaining sheets are corrugated such that the corrugation axes are parallel to the arcuate base, FIGURE 5. However, the sheets may also be corrugated with the corrugation axes at some angle between the two illustrated extremes. Due to the linear variation in corrugation height, a pyramidal-spherical sector 3 will be formed by lamination of the individual sheets and, by assembling a plurality of these sectors, a spherical body 4 is produced. Since the corrugation variation is linear from the apex of the sector radially outwardly, the dielectric constant will vary similarly. By proper choice of material and corrugation slope, the dielectric constant can be controlled to vary linearly from two at the apex of the sector to one at the arcuate base. While this does not exactly comply with the Luneberg function, it will yield a close linear approximation thereto.

In corrugating the sheets, it is preferred to limit the height of the corrugations to less than one-tenth of the wavelength of the microwave to be transmitted through the lens. It has been found that internal reflections do not occur in lenses produced with corrugations so limited.

Figure 6:
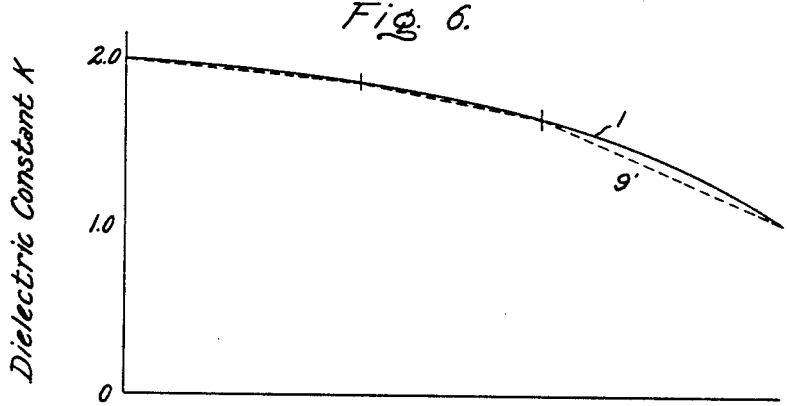
FIGURE 6 illustrates, by the dotted line, a three-step approximation of the Luneberg function using a linear variation for each step.
Figure 7:
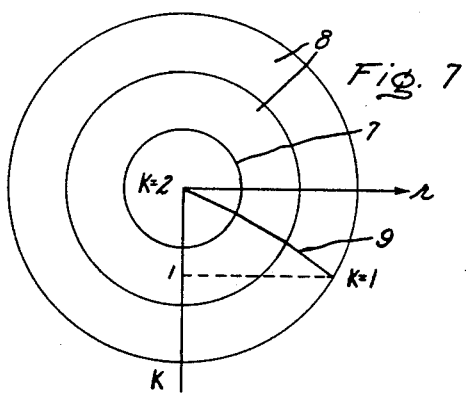
FIGURE 7 is a cross-sectional view of a spherical lens taken along line 7—7 in FIGURE 3 and having a set of coordinates transposed thereon to indicate the radial variation of the dielectric constant.

A closer approximation of the Luneberg function may be obtained by dividing the spherical lens into two or more concentric spherical sections such as a core 7 and one or more concentric shells 8 each of which has a dielectric constant which varies linearly from the innermost portion thereof radially outwardly towards its outer surface. This is illustrated in FIGURE 7 wherein a set of coordinates K—r is transposed upon a cross-section of a sphere. Any radial line 9 indicates the linear variation of the dielectric constant from two at the center to one at the surface. Each linear section is designed with a slope median to that section of the Luneberg function which the linear section approximates. A three-step approximation is illustrated by the dotted lines 9' in FIGURE 6, the solid line 1 representing the Luneberg function. By comparison of FIGURE 1 and FIGURE 6, it may be noted that the segmented approximation of the Luneberg curve is considerably more accurate than the stepped approximation of the prior art.

In forming the shells 8 which are placed concentrically about the spherical core 7, the sectors used therein are truncated pyramidal-spherical sectors 10 as illustrated in FIGURE 8. The truncated sectors are formed so that the dielectric constant of the smaller base 11 is substantially equal to the dielectric constant of the spherical surface with which it is contiguous and the dielectric constant varies linearly throughout the sector's radial width toward the larger base 12.

A second method for forming pyramidal-spherical sectors is illustrated in FIGURES 9–11. A plurality of thin plastic sheets 13 and 14, each having the same thickness and each being of uniform thickness throughout, is corrugated such that each corrugation height is constant throughout its length. These corrugated sheets are laminated into block form 15, FIGURE 9, wherein the corrugation axes of each sheet is angularly disposed to the corrugation axes of the sheet immediately adjacent thereto. The block laminate is then heated to such a temperature that it can be reformed first into a wedge shaped sector 3' (FIGURE 10) and then into a pyramidal-spherical sector 3 as shown in FIGURE 11. This method will vary the dielectric constant linearly and not in accordance with the Luneberg function; however, by dividing the sphere into a plurality of concentric shells as described above, a very close approximation to the ideal curve can be obtained. This is due to the fact that each linear segment can be designed with a slope median to that segment of the Luneberg curve which the linear segment approximates (see FIGURE 7).

In FIGURE 12 a third method is illustrated which is very similar to the second method just described. This method involves forming the same block laminate 15 as in the previous method from corrugated sheets (dotted lines) and reshaping the block into a desired shape 16 as illustrated by the solid lines prior to heating and then reforming into the pyramidal-spherical sector. The step of reshaping involves the process of removing portions of the block such that the thickness of the block after reshaping is proportional to the function $a/A - (a/A)^3$ where $a$ is the distance from the end 17 of the block which will eventually become the apex of a pyramidal-spherical sector to the point at which the thickness is measured and $A$ is the length of the block measured along a central, longitudinal axis. It can be seen that the thickness of the block varies from zero at its one end to a maximum near its center. By reforming this block into the specific pyramidal-spherical sector 3, the dielectric constant will vary curvilinearly in accordance with the theoretical Luneberg equation.

Utilization of this method will produce a dielectric constant approximating that for air on the lens surface due to the minimum of material there and a dielectric constant of two at the sphere center because of the density caused by the joining of all sector apices at that point. While it may be difficult to obtain this optimum result in practical manufacturing operations, the closer the approach to this design which economics permit, the more accurate will be the results.

Another method for achieving similar results is to utilize thin plastic sheets, the thickness of which varies in accordance with the function $a/A - (a/A)^3$ where $a$ and $A$ have the same meaning as above but with relation to a sheet. Upon completion of the formation of constant height corrugations and lamination of the sheets into a laminate, the laminate will take the form illustrated by the solid line 16 in FIGURE 12. Sheets of such varied thickness may be formed by extruding plastic sheets through a properly shaped die having the proper thickness variation along an axis perpendicular to the direction of extrusion. By proper orientation of the sheets prior to corrugation, the thickness profile will be radial with reference to the finished spherical lens.

An alternative method using varied thickness sheets includes corrugating the sheets whose thickness varies linearly such that the corrugation heights are constant throughout their length, and, after laminating the sheets as described above, reforming the block laminate into a pyramidal-sperical sector. This method will produce a linear dielectric constant variation.

In summary, all of the above-described methods have the following steps in common: corrugating a plurality of thin dielectric elements, laminating them with the corrugation axes of adjacent elements angularly disposed with respect to one another, and forming the laminate product into a pyramidal-sperical sector whereby an assembly of a plurality of the sectors produces a spherical body. Depending upon the particular process used, the dielectric constant can be caused to vary at a predetermined rate from the apex of the sector radially outwardly towards the arcuate base. The predetermined rate can either be a linear function or a curvilinear function closely approximating or substantially equalling that described by the Luneberg equation $K = 2 - (r/R)^2$. The methods used for achieving the predetermined rate include forming corrugations of varying height, more particularly, increasing the height linearly from the apex of the sector radially outwardly; forming corrugations of constant height, using dielectric elements of constant thickness and reforming the laminate block resulting from the lamination thereof into the proper sector shape; using constant thickness dielectric elements, forming corrugations of constant height, and reshaping the block laminate into a shape the thickness of which is proportional to the function $a/A - (a/A)^3$ and then reforming into the proper sector shape; or varying the thickness of the dielectric elements prior to the corrugation according to the function $a/A - (a/A)^3$ and reforming the resulting block into the proper sector shape.

Where a linear variation of the dielectric constant is produced, the ideal Luneberg function can be more closely approximated by forming the complete sphere from a plurality of concentric shells, the dielectric constant of each shell varying linearly through its thickness with a slope median to that section of the Luneberg curve which the particular linear section approximates.

The spherical body resulting from the above-described processes has a dielectric constant which varies in accordance with a function very closely approximating or substantially equalling that described by the ideal Luneberg equation. In addition, the simulated foamed structure formed by the laminated corrugated sheets permits the introduction of a coolant, such as air, into the interior of the sphere thus facilitating the dissipation of the heat generated therein. The flow path of the coolant is dependent upon the shape of the corrugations. It has been found that by designing the corrugations in the form of involutes radiating from the center of the resultant sphere the cooling efficiency can be increased significantly.

While the specific forms and methods of the invention have been shown and described, it will be apparent to those skilled in the art that numerous changes, combinations, and substitutions of equivalents might be made. It is, therefore, contemplated by the claims which conclude this specification to cover all such modifications as fall within the true spirit and scope of this invention.

What we claim as new and desire to secure by Letters Patent of the United States is:

1. A spherical lens capable of focusing parallel microwave rays at a point on the periphery of the sphere diametrically opposed to the tangent plane of entry of said rays, said lens comprising a plurality of pyramidal-spherical sectors, each of said sectors having a dielectric constant which is maximum at the apex of said sector and which varies at a predetermined rate toward the arcuate base of said sector, said sectors being assembled to form a sphere whose dielectric constant is maximum at the center and decreases radially at a predetermined rate.

2. A spherical lens as defined in claim 1 wherein the dielectric constant of each of the sectors decreases linearly from the apex radially outwardly and wherein the dielectric constant of the sphere decreases linearly from the center radially outwardly.

3. A sperical lens as defined in claim 1 including a spherical shell contiguously surrounding said sphere, said shell comprising a plurality of truncated pyramidal-spherical sectors, each of said sectors having a small arcuate base and a large arcuate base with a maximum dielectric constant of each of said truncated sectors occurring at the small base and decreasing radially at a predetermined rate, the value of the maximum dielectric constant of each of said truncated sectors being substantially equal to the value of the dielectric constant at the surface of said sphere.

4. A spherical lens as defined in claim 1 including a spherical shell contiguously surrounding said sphere, said shell comprising a plurality of truncated pyramidal-spherical sectors, each of said sectors having a small arcuate base and a large arcuate base with the maximum dielectric constant of each of said truncated sectors occurring at the small base and decreasing linearly radially outwardly, the value of the maximum dielectric constant of each of said truncated sectors being substantially equal to the value of the dielectric constant at the surface of said sphere.

5. A spherical lens for focusing microwaves, said lens being capable of focusing parallel rays at a point on the periphery of the sphere diametrically opposed to the tangent plane of entry of said rays, said lens comprising a plurality of pyramidal-spherical sectors, the dielectric constant of each of said sectors being maximum at the apex of said sector and varying at a predetermined rate towards the arcuate base of said sectors, each of said sectors being formed from a plurality of corrugated sheets wherein the maximum height of the corrugations is equal to one-tenth of the wavelength of said microwaves, the corrugations defining a plurality of coolant passages therethrough, said sectors being assembled to form a sphere whose dielectric constant is at a maximum at the center and decreases radially at a predetermined rate.

6. A spherical lens capable of focusing parallel microwave rays at a point on the periphery of the sphere diametrically opposed to the tangent plane of entry of said rays which comprises an assembly of a plurality of pyramidal-spherical sectors in the form of a sphere, each of said pyramidal-spherical sectors being formed from a plurality of thin corrugated elements of a dielectric material with the corrugation axes of adjacent elements being angularly disposed with respect to one another to obtain a maximum dielectric constant at the apex of the sector which decreases radially towards the arcuate base of the sector at a predetermined rate.

7. The article of claim 6 wherein the dielectric constant of each of the sectors decreases linearly from the apex radially outwardly and wherein the dielectric constant of the sphere decreases linearly from the center radially outwardly.

8. The article of claim 6 wherein the height of corrugations of each of said elements varies at a predetermined rate from the end forming the apex of the sector to the end forming the arcuate base of the sector, and wherein each of said elements has the same uniform thickness throughout.

9. The article of claim 6 wherein the thickness of each of said elements varies at a predetermined rate and wherein the height of the corrugations of each of said elements in constant throughout the length of the corrugations.

10. The article of claim 6 wherein the thicknes of each of said elements decreases linearly from the apex of said sector radially outwardly.

11. A spherical lens capable of focusing parallel microwave rays at a point on the periphery of the sphere diametrically opposed to the tangent plane of entry of said rays which comprises an assembly of a plurality of truncated sectors about a sphere in the form of a spherical shell having an inner and outer surface, said shell having an inner radius equal to the radius of said sphere and having a dielectric constant which decreases radially at a predetermined rate from a maximum value at said inner surface to a maximum value at said outer surface, the value of the dielectric constant at said inner surface being substantially equal to the dielectric constant at the surface of said sphere, each of said truncated pyramidal-spherical sectors being formed from a plurality of thin corrugated elements of a dielectric material with the corrugation axes of adjacent elements being angularly disposed with respect to one another to obtain a maximum dielectric constant at the inner surface end which decreases radially at a predetermined rate.

12. A spherical lens capable of focusing parallel microwave rays at a point on the periphery of the sphere diametrically opposed to the tangent plane of entry of said rays which comprises an assembly of a plurality of pyramidal-spherical sectors in the form of a sphere, each of said pyramidal-spherical sectors being formed from a stack of corrugated thin elements of a dielectric material having the corrugation axes of adjacent sheets being angularly disposed with respect to one another, with each stack being shaped in the form of a pyramidal-spherical sector such that the maximum dielectric constant occurs at the apex of the sector and decreases radially toward the arcute base of the sector at a predetermined rate.

13. The article of claim 12 wherein the dielectric constant of each of the sectors decreases linearly from the apex radially outwardly and wherein the dielectric constant of said sphere decreases linearly from center radially outwardly.

14. A spherical lens capable of focusing parallel microwave rays at a point on the periphery of the sphere diametrically opposed to the tangent plane of entry of said rays which comprises an assembly of a plurality of truncated sectors about a sphere in the form of a spherical shell having an inner and outer surface, said shell having an inner radius equal to the radius of said sphere and having a dielectric constant which decreases radially at a predetermined rate from a maximum value at said inner surface to a minimum value at the outer surface, the value of the dielectric constant at said inner surface being substantially equal to the dielectric constant at the surface of said sphere, each of said truncated sectors being formed from a stack of thin corrugated elements of a dielectric material with the corrugation axes of adjacent elements being angularly disposed with respect to one another, each stack being shaped in the form of a truncated pyramidal-spherical sector having a small arcuate base and a large arcuate base such that the maximum dielectric constant of the truncated sector occurs at the smaller base and decreases radially at a predetermined rate.

No references cited.